June 6, 1967 J. HENRY-BAUDOT 3,324,323
FLAT CONDUCTOR WINDINGS AND ELECTRIC ROTARY
MACHINES EMBODYING SAME
Filed Dec. 10, 1964 10 Sheets-Sheet 1

INVENTOR
Jacques Henry-Baudot
BY Kemon, Palmer,
Stewart & Estabrook
ATTORNEYS

June 6, 1967  J. HENRY-BAUDOT  3,324,323
FLAT CONDUCTOR WINDINGS AND ELECTRIC ROTARY
MACHINES EMBODYING SAME
Filed Dec. 10, 1964  10 Sheets-Sheet 4

INVENTOR
Jacques Henry Baudot
BY
ATTORNEYS

June 6, 1967  J. HENRY-BAUDOT  3,324,323
FLAT CONDUCTOR WINDINGS AND ELECTRIC ROTARY
MACHINES EMBODYING SAME
Filed Dec. 10, 1964  10 Sheets-Sheet 7

INVENTOR
Jacques Henry-Baudot
BY
ATTORNEYS

United States Patent Office 3,324,323
Patented June 6, 1967

3,324,323
FLAT CONDUCTOR WINDINGS AND ELECTRIC ROTARY MACHINES EMBODYING SAME
Jacques Henry-Baudot, Antony, France, assignor to Printed Motors, Inc., New York, N.Y.
Filed Dec. 10, 1964, Ser. No. 417,453
Claims priority, application France, Dec. 16, 1963, 957,249, Patent 1,390,995; Oct. 22, 1964, 992,326, Patent 1,421,418, 992,327, Patent 1,419,855
27 Claims. (Cl. 310—203)

The present invention concerns improvements in or relating to windings made of thin and flat conductors intimately bonded to the opposite faces of an insulating carrier over which they are distributed in two layers of half-turns which are selectively interconnected by their ends from one face to the other one of the insulator; said conductors being preferably formed from application of any technique enabling the reproduction of conductive patterns on an insulating surface, otherwise said, from any so-called "printed-circuit technique."

The invention also concerns the electrical rotating machines embodying such windings in their armature or/and field members, with linear, cylindrical or annular airgaps.

Flat conductor windings of the above referred kind are known either of the series-wave or lap-wound circuit pattern, having the half-turn conductors orientated transversely with respect of the carrier with their ends regularly interconnected from one face to the other one of said carrier so that each turn substantially covers one polar pitch and that, after a number of traverses of the winding, in a series-wave one, or after a number of turns, in a lap-wound winding, the winding closes on the half-turn conductor from which such a series circuit initiates.

The formation of such windings is plain as long as the carrier is flat and the winding covers the complete surfaces of said carrier. Difficulties are encountered for "printing" a winding of closed electrical circuit as soon as such conditions are not met, i.e. the winding member must be warped into a closed loop (including a cylindrical one) and/or the winding is not provided for covering the complete surfaces of the carrier.

It has been previously proposed to make a closed loop winding member by first printing the conductors on the faces of a thin and flat elongated carrier, thereafter folding it into a closed loop and making the interconnections between the conductors at the abutting ends of said carrier for completing the closed electrical circuit of the winding. In order to ease the manufacture to at least some extent, it has further been proposed to print the two sets of half-turn conductors with a relative shift equal to substantially one polar pitch of the winding from one face to the other one of the carrier, folding the thus coated carrier into a loop with overlapping of the shifted ends of said prints, and completing the electrical circuit by establishing the face-to-face connections between the ends of the half-turn conductors, at least in the said overlapping portions of the loop (the other face-to-face connections might have been made prior to the folding operation).

An object of the invention is to so provide a winding member on a flat elongated insulating carrier that the electrical circuit of the winding is closed on said carrier though it is of finite length and not looped—or, in certain cases, so that, when the member is to be formed into a loop, a single end connection is to be made for closing such an electrical circuit.

A winding member according to the invention is mainly characterized in that it comprises, on a flat elongated insulating carrier, a winding section made of a first set of half-turn conductors adhering to one face of said carrier and leaving at one end thereof a bare surface of the insulator extending substantially over one polar pitch of said winding section, of a second set of half-turn conductors adhering to the other face of the carrier and leaving at the end opposite to the one in the first set of a similar bare surface of the insulator, each half-turn conductor extending transversely to the carrier and having ends laterally shifted at the span of one-half of the polar pitch of the winding section, said shift being reversed from one set to the other one, face-to-face connections between the registering ends of the conductors in said two sets, and additional conductor means on said carrier for closing substantially the electrical circuit of said winding section by connecting part at least of the ends of the half-turn conductors facing such bare surfaces.

This and other features of the invention will be described in full detail with reference to the accompanying drawings, wherein.

Figure 8:
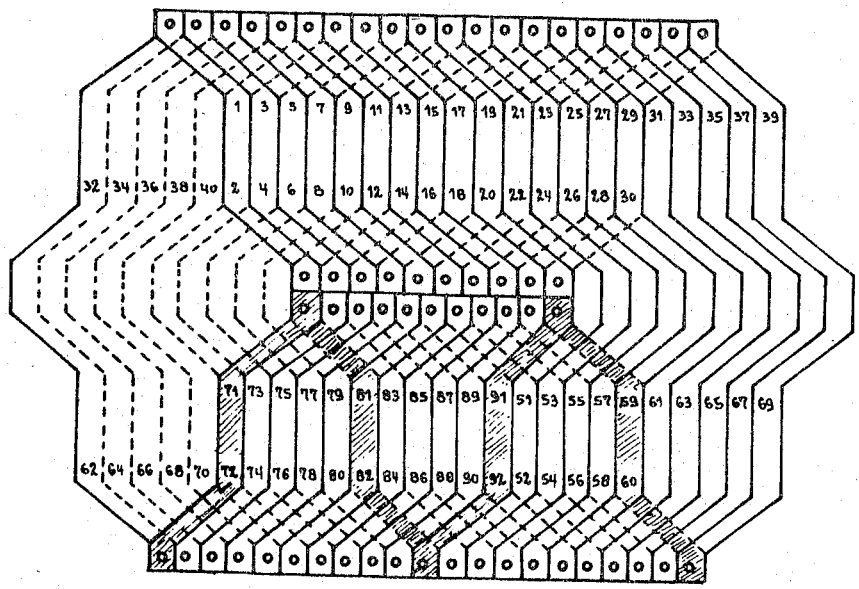
FIG. 8 shows a modification of the winding member of FIG. 1.
Figure 14:
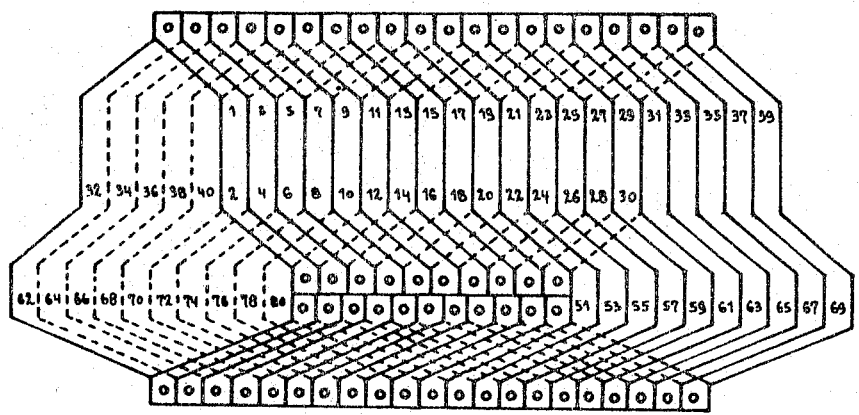
Figure 13:
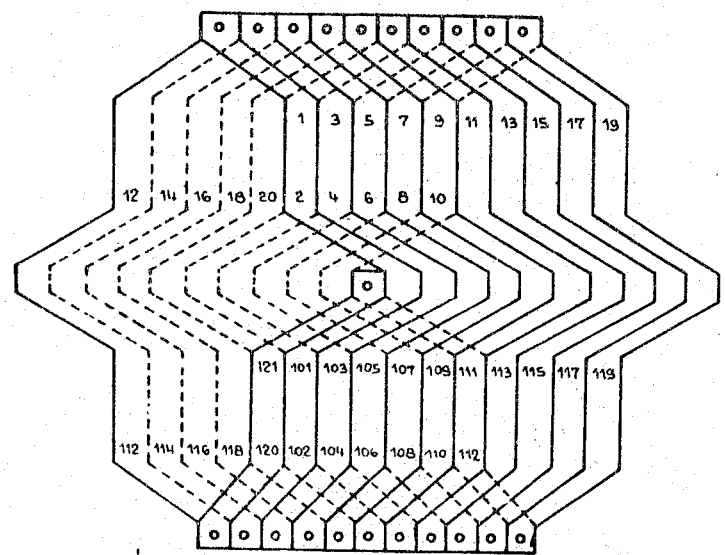
Figure 15:
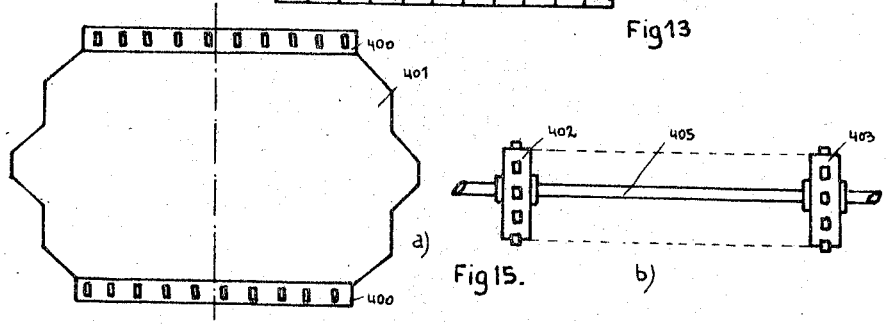
Figure 16:
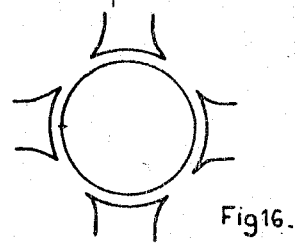
Figure 17:
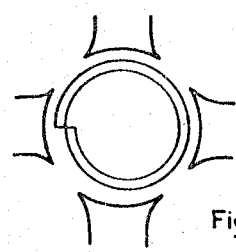

FIG. 13, on the other hand, shows a winding member for a two-pole machine;

FIG. 14 shows a further modification of the embodiment of FIG. 8;

FIG. 15, in two views, (a) and (b), shows an example of the fashion for utilising a winding member such as in the preceding figures for making the rotor of a cylindrical machine;

FIGS. 16 and 17 show schemes of utilisation of such winding members in cylindrical airgap machines;

FIGS. 18 to 25 show the adaptation of part of the preceding arrangements to winding members of the lap-wound kind.

From these examples, any further variation of technological manufacture and practical use of winding members according to the invention will be readily apparent.

In the first embodiments to be described, relating to windings of the series-wave kind, the flat insulating carrier comprises two parallel bands along its length, a first group of conductors distributed in one of said band for constituting a section of series-wave winding thereon, and additional conductors distributed in the other one of said bands for closing or at least substantially closing the series paths in said section of series-wave winding by connecting them in series relation between the ends of said winding section.

Said additional conductors may be made either as simple connection arrays or they may be made as a further section of either series-wave or lap-wound winding.

Figure 4:
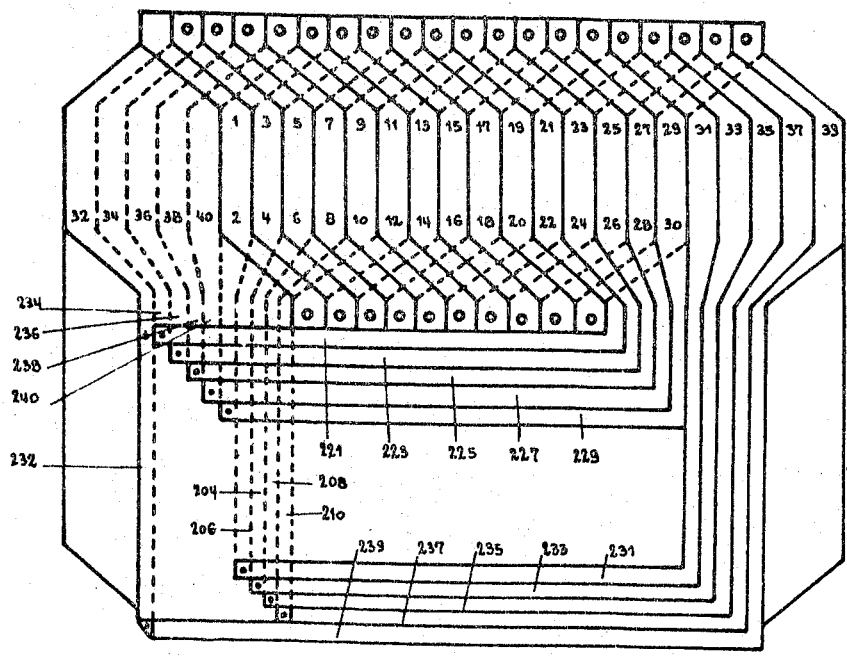
FIG. 4 shows another example of embodiment for a series-wave winding member, with return loops made of arrays of conductors which do not constitute a winding section.

The additional conductors are, for instance, as shown in FIG. 4, distributed in two arrays in the lower band of the carrier whereas the upper band carries a section of series-wave winding, illustratively shown as comprising twenty half-turn conductors per face, each polar pitch including five of said conductors. The front face conductors are numbered 1, 3, 5, . . . 39; the rear face conductors are numbered 2, 4, 6, . . . 40. Each half-turn conductor is illustratively shown with a median portion which is substantially orthogonal to the lateral edges of the carrier, extended both sides by reversely inclined portions. In the drawings, the solid black lines indicate the separations between the conductors, on the front face, the dashed black lines indicate the separation between the conductors on the rear face. The shift between the ends of the half-turn conductors defines the half-polar pitch of the winding section. This last-mentioned feature is preserved when other shape of half-turn conductors is used instead of the illustrated one, for instance when the median portion is slanted or curved and/or the side portions curved or reduced in height.

The last five half-turn conductors on the right of the front face of the carrier, from 31 to 39, have no corresponding half-turn conductors on the rear face of the carrier; conversely, the five left half-turn conductors on the rear face of the carrier have no corresponding half-turn conductors on the front face, these conductors being 32 to 40. Such an arrangement leaves on the insulating carrier, and on opposite ends and faces thereof, two bare surfaces covering each one polar pitch approximately. If such a member is later folded in a closed loop with abutting end edges, said bare surface will contact each other and the front face conductors 31 to 39 will come in due registration with the rear face conductors 32 to 40 in their median transverse portions, but with interposition of the insulating carrier. The looped member will span over four polar pitches as each set of half-turn conductors in the flat shape of the member each spans over such four polar pitches. At their lower ends, half-turn conductors 32 to 10 on the rear face, half-turn conductors 21 to 39 on the front face, are left open as not ending in definite terminals as are conductors 12 to 30 and 1 to 19 at the lower ends thereof. All conductors end in such a terminal at their upper ends, at or near the edge of the carrier. Once face-to-face connections are provided between the registering end terminals of the two layers of half-turn conductors, the following circuits are established in said winding section:

```
32- 1-12-21
34- 3-14-23
36- 5-16-25
38- 7-18-27
40- 9-20-29
    2-11-22-31
    4-13-24-33
    6-15-26-35
    8-17-28-37
   10-19-30-39
``` so that for connecting said elementary circuits in series and closing the electrical pattern of the winding, ten connections are necessary, from 21 to 24, 23 to 36, and so on up to the connection between 39 and 32.

Such interconnections are made on the lower band of the carrier. The ten conductors 21 to 39, spanning over twice a polar pitch, are extended by metallizations of the insulator developing in the lower band of the carrier, in two groups, 221 to 229 and 231 to 239, partly extending along the length of the carrier; similarly, the conductors 32 to 40 and 2 to 10 are extended by two groups of metallizations, 234 to 240 and 202 to 210; the rear and front face metallizations are connected from face to face and at selected points (not necessarily those illustrated) by through connections such for instance as metallized holes in the carrier, so that the above mentioned additional connections are completed between the ends of the elementary series circuits in the upper winding band.

The spacing between the groups of additional conductors extending longitudinally to the band of the carrier is made substantially equal to the height of the median portions of the conductors in the winding section and, more generally speaking, equal to a reduced height with respect to the transverse span of the half-turn conductors, and the height of each group is further reduced, so that, when for instance the lower band of the member is folded along a longitudinal midline of the carrier, the longitudinal extensions of the said additional conductors come over the end portions only of the half-turn conductors. In such a folding operation, precaution is taken for insulating the conductors which come over one another, either by a superficial insulating film formed over the conductors, or by the interposition of a thin insulating sheet. Such a folded member will have only the dimensions of the series-wave winding band with normal pole areas in the height of the half-turn conductors due to the restriction of the height of the groups of additional conductors and the spacing thereof. Such a member may thereafter be made in the form of a closed loop, if required, with the end conductors in relative overlap as said.

Figure 3:
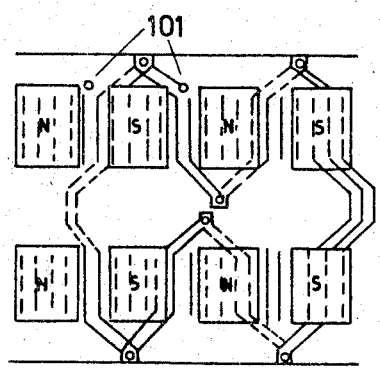
FIG. 3 shows a diagram for the use of such a member with a magnet field arrangement.

It is however deemed preferable to constitute the additional conductor group or groups as a winding section so that the winding member may be used, as shown in FIG. 3, with a double field structure of magnetic poles (either permanent magnet poles or wound and D.C. fed poles). In FIG. 3, which is a diagram which does not infer any special shape of the airgap, two rows of magnetic poles are shown, in registration of magnetic denomination from the upper to the lower row. A similar result would be obtained when using magnetic poles of a sufficient height to substantially span over the complete height of the winding member. The winding is then used at its maximum efficiency whereas, on the other hand, brushes such as 101 are used to collect or derive current from the winding and need only to be applied to one band only of the winding member.

Figure 1:
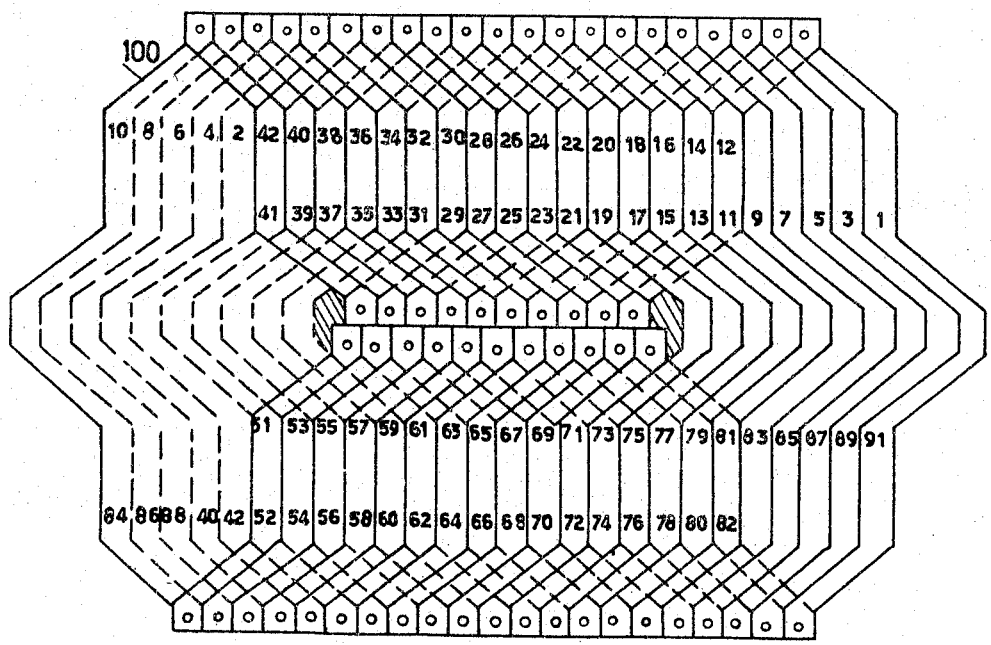
FIG. 1 shows a first example of embodiment for a four-pole winding member, comprising two winding sections of the series-wave kind on two parallel winding bands on the insulating carrier.

Referring now to FIG. 1, such a two series-wave winding section member is shown which comprises, in the upper winding band of the carrier, a series-wave section of progressive pitch and in the lower winding band, a series-wave section of recessive pitch. The pitch of a series-wave winding is termed progressive when, starting from a conductor and after one path followed around the winding, the circuit reaches the conductor following the one taken as a starting place, whereas the pitch is said recessive when, starting from a conductor and after one path around the winding, the circuit reaches the conductor preceding the one from which it has started. In FIG. 1, each winding section comprises twenty-one conductor per face, each polar span including five half-turn conductors. With the numbering of half-turn conductors shown in the drawing, the table of winding is as follows:

| Progressive pitch section | Recessive pitch section |
|---|---|
| 1-12-23-34 | 60-69-80-89 |
| 3-14-25-36 | 58-67-78-87 |
| 5-16-27-38 | 56-65-76-85 |
| 7-18-29-40 | 54-63-74-83 |
| 9-20-31-42 | 52-61-72-81 |
| 11-22-33- 2 | 92-59-70-79 |
| 13-24-35- 4 | 90-57-68-77 |
| 15-26-37- 6 | 88-55-66-75 |
| 17-28-39- 8 | 86-53-64-73 |
| 19-30-41-10 | 84-51-62-71 |
|  | 82-91- |

1.

This table must be read in the sequence of the conductors, line per line and from left to right in each line. For instance, starting from half-turn conductor 1, on the front face of the carrier, the circuit passes to conductor 12, on the rear face, then to conductor 23, front face, to conductor 34, rear face, extending directly to conductor 60, rear face of the lower winding section, and then to conductor 69, front face, to conductor 80, rear face, to conductor 89, front face, directly extended to conductor 3 of the upper winding band; and so forth.

It may be noted that, in the progressive pitch section, two half-turn conductors are not used, Nos. 21 and 32. Such kind of "dead" conductors is usual in series-wave winding patterns of conventional structure, and their presence does not affect the working of the winding proper.

The winding pitch of the winding section of progressive pitch is, in the concerned example, equal to 22, i.e. an "outer" pitch equal to 11 and an "inner" pitch equal to 11 too. In the recessive pitch winding, the winding pitch is equal to 20, that is to say an "outer" pitch equal to 9 and an "inner" pitch equal to 11.

It may be further noted that, in the lower winding section, each interconnection between conductors ending a path to conductors of the upper winding band section comprises two turns with the exception of the final one, which comprises three turns, namely 84–51, 62–71, 82–91.

Figure 2:
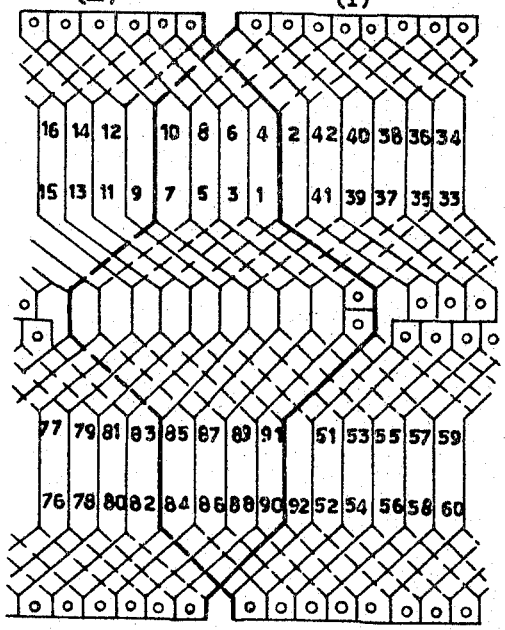
FIG. 2 shows how two such members may be interconnected.

Two members such as the one of FIG. 1 may be interconnected in the manner disclosed in FIG. 2. The right-hand end of the member II is brought in overlapping relation with the left-hand end of the member I so that the conductor 1 of the member II and the conductor 91 of said member respectively overlap the conductors 4 and 90 of the member I. The connections between said conductors 1 and 91, on the first part, and between the conductors 34 and 60 of member I on the other part, are interrupted, for instance by dividing the metallizations on the carriers, which interconnected such conductors. Additional connections, for instance made through metallized holes, are established between the conductor 34 of the member I and the conductor 1 of the member II, and between the conductor 91 of the member II and the conductor 60 of the member I. With such connections, after after the first path followed on the member I, from conductor 1 to conductor 34, according to the preceding table, the electrical circuit directly passes to conductor 1 of the member II and then follows the complete above winding chart on said member up to conductor 91, from which the circuit is brought back to the member I, conductor 60 and there follows up to the conductor 1, the said winding chart.

Obviously, as many members as required may be so interconnected for constituting winding composite members having a number of polar pitches multiple of four. Obviously, too, such winding members of multiple pole pitches may be directly printed on a single carrier insulator.

Figure 5:
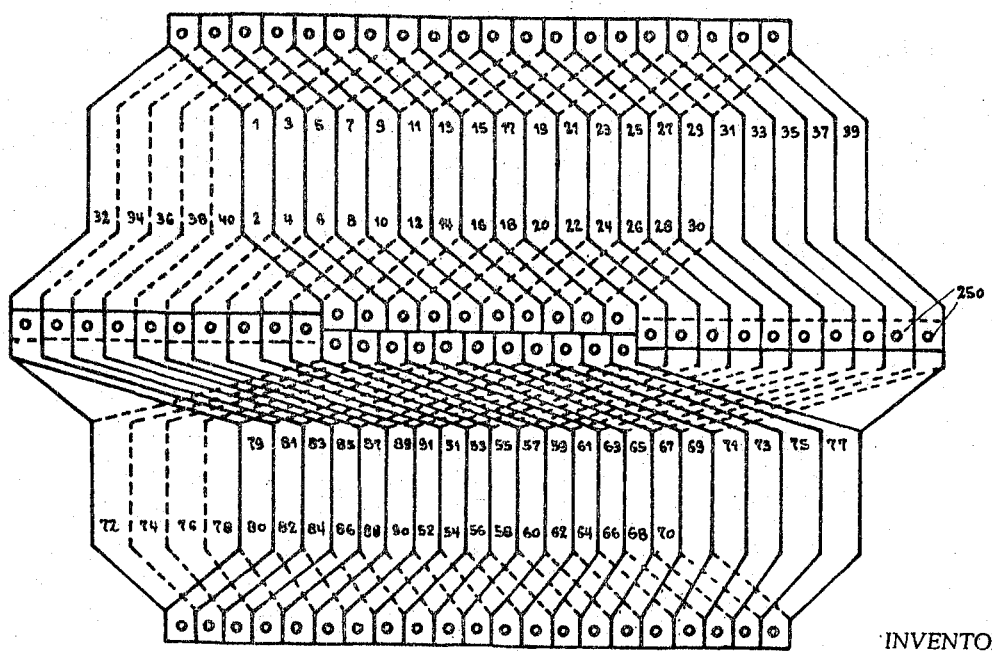
FIG. 5 shows a further example of embodiment for a series-wave winding member, with return loops ensured by turns constituting a lap-wound winding section.

Instead of closing the series-wave section by a section of similar kind of winding, it is possible, as shown in FIG. 5, to provide the additional connecting conductors as turns of a lap-wound section progressing in the reverse direction to that followed on the series-wave section, along the insulating carrier. The series-wave section in the upper band of the carrier is shown identical to that disclosed in FIG. 4. The front face half-turn conductors 21 to 39 of said section are respectively connected, for instance through metallized holes or other through-connections such as 250, to rear face conductors 52 to 70 of lap-wound turns arranged in the lower winding band of the carrier, and the rear face 32 to 10 of the upper band are similarly connected to front face conductors 79 to 55 of said lap-wound set of turns. The numbering of the half-turn conductors of the lap-wound section is made similarly to that of the series-wave section, starting from the first straight connection between conductors 21 and 52. In the lap-wound section, there is only four conductors at each end, 71 to 77 on the front face, 72 to 78 on the rear face, which have no corresponding conductors on the other face of the carrier. The connection between conductors 21 and 34 is ensured by the following conductors: –54–59–74 and 81; the connection between 23 and 36 is similarly ensured by the conductors 54–61–76–83; and so forth, the final connection between 39 and 32 is ensured by the conductors 70–77–92–57–72–79, that is to say with one lap-wound turn more than the other ones.

For each elementary path followed on the series-wave winding section, two lap-wound turns are interposed before the next path on said series-wave section; three for the last connection. This is because the winding pitch is preserved substantially from the upper to the lower winding bands. In such a case, a magnet field arrangement such as the one of FIG. 3 may be associated to the winding member. Of course, it may be possible to vary the number of turns of the lap-wound kind interposed between two paths on the series-wave section, and to modify the magnet field arrangement accordingly in its lower row.

Of course, any winding member according to the invention may be used either as an armature or a field member, and further, it may be used in synchron-machines such as resolvers, synchro-detectors and the like, two such members being then associated within a common airgap and one of them at least being displaceable with respect to the other one.

As said, such winding members may be used in linear airgaps either with a to-and-fro movement (in which case, they may be formed on rigid carriers or glued on additional rigid carriers if formed on flexible ones), or with a continuous movement (in which case they must be priorly formed as closed loop, as for their use in cylindrical airgaps).

When such a winding member is to be shaped as a closed loop, it is advantageous that the delineation of the carrier and the coverage of its surfaces by the conductors be such that no discontinuity exists between the conductors and specially between the end parts thereof, nor on the other hand no indue overlapping between the conductors brought in face to face relation at the folding.

Figure 6:
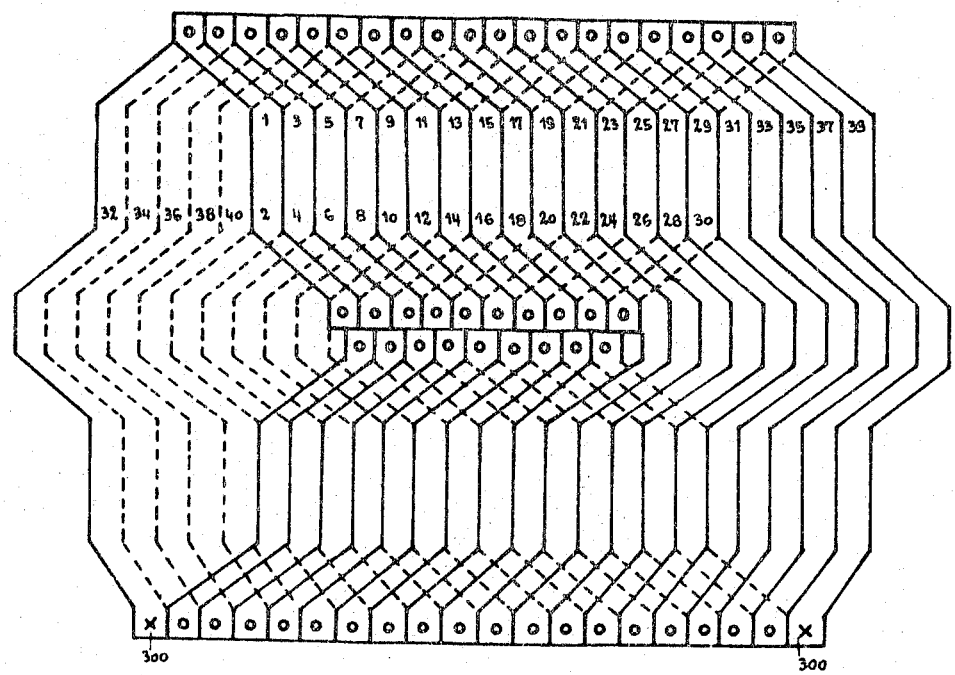
FIG. 6 shows another example of embodiment for a two-section series-wave member, with an electrical circuit which is only closed after the member has been formed into a loop.

For such members which are intended to be later shaped as closed loops, it is conceivable, as shown in FIG. 6, that for closing the electrical circuit, one may have recourse to a single connection, such as a soldering, between end terminals. Referring to said FIG. 6, the second section, the lower one, provided with one half-turn conductor less, on each face, than the upper one, has a lower row of terminals the length of which is greater by two terminals widths, as shown at 300, the length of the upper row or terminals in the upper winding section. When shaped as a closed loop, the terminals 300 come in registration through the insulator and by soldering or other through connection, between them, the electrical circuit is completed.

Figure 7:
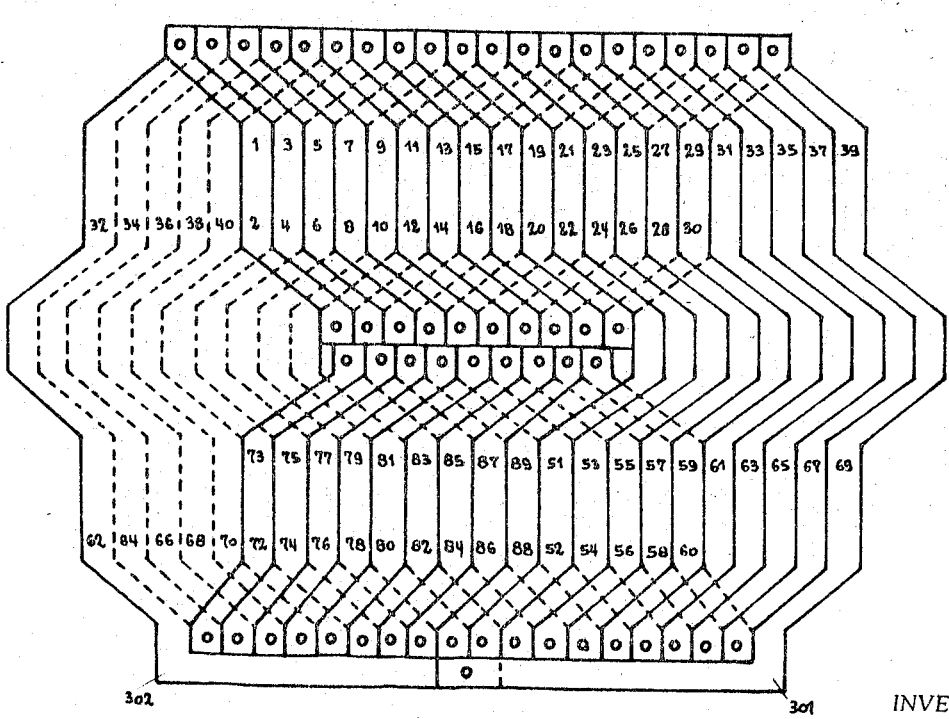
FIG. 7 shows a further example of embodiment for a two section winding member, the electrical circuit of which is closed externally to the winding bands thereof.

A further modification is shown in FIG. 7, wherein the electrical circuit is complete as soon as the printing is made on the carrier. The length of the lower edge is reduced to the length of the upper edge and the two conductor bands 301 and 302 extend from the end conductors 69 and 62, said bands being parallel to said lower edge and being connected from one face to the other one, preferably at the mid-length point as shown in the drawing. The increase of surface of the whole member is negligible and the electrical equilibrium of the winding member, from the upper to the lower winding band is quite good.

However, if desired, such a final closing connection may be inserted within the lower winding band and more specifically, within the winding section in said lower band. Actually it was that which was already shown in FIG. 1 and which is more clearly visible on the embodiment of FIG. 8, which distinguishes from FIG. 1 in that the upper winding section is to provided that any "dead" conductor is avoided, and the said arrangement is made as the one in FIG. 4 for the same upper winding section.

The lower band winding section comprises one more half-turn conductor per face than the upper one. The final connection from 39 to 32 is made through the lower band through conductors 69–60–91–82–71 and 62.

The integration of the final closing connection to the lower band winding section may be further made, if desired, with more degree of circuit complexity. For instance, in FIG. 9, which only shows the said lower band of the winding member, the rear face conductor 60 connected to the front face conductor 69 has no correspondant on the front face of the carrier, and the front face conductor 70 has no correspondant on the rear face; the conductors 60 and 71 are connected by metallisations from 303 to 306 alternatively on the front and rear faces and interconnected by through connections such as metallized or plated holes between them and with the conductors 60 and 71. These metallizations are restricted to the higher rows of the upper parts of the half-turn conductors of the said second section and are made from subdivision of of such parts. When at a later stage and if required, the winding member is made as a closed loop, the conductors 50 and 71 will overlap one another as overlap conductors 61 to 69 and 62 to 70. The relative insulation of conductors 60 and 71 must however be lend special attention as they are on the edges of the arrays of conductors which do not normally overlap but are printed on faces of the carrier opposite to that of the normally overlapping conductors in the closed loop shape of the winding member.

Figure 10:
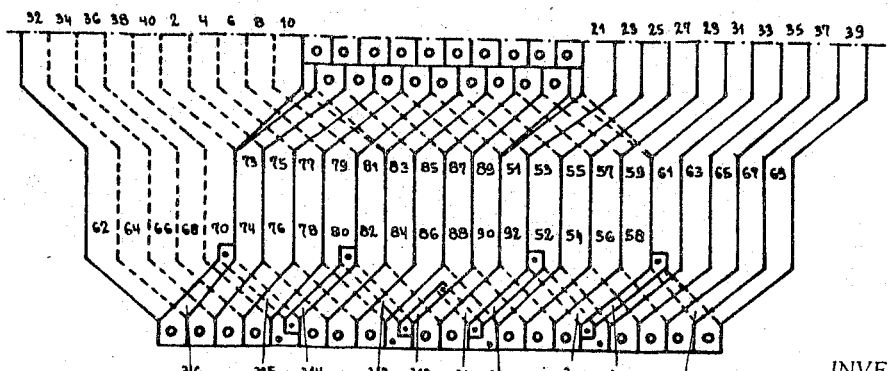

In the modification of FIG. 10, no half-turn conductors are provided for closing the final connection of the electrical circuit but mere metallizations, from 307 to 316, obtained by subdividing the lower parts of the normal half-turn conductors, said metallizations being regularly interconnected by means of through connections such as metallized or plated holes. Preferably, the pattern of such zig-zag metallizations is provided symmetrical with respect to the middle of the length of the winding member.

Up to this point, only four pole winding members have been considered. In order to clearly show that the invention may be applied to any and all numbers of poles, FIGS. 11 and 12 respectively show members adapted for six and eight poles in their span on each face of the member.

Figure 11:
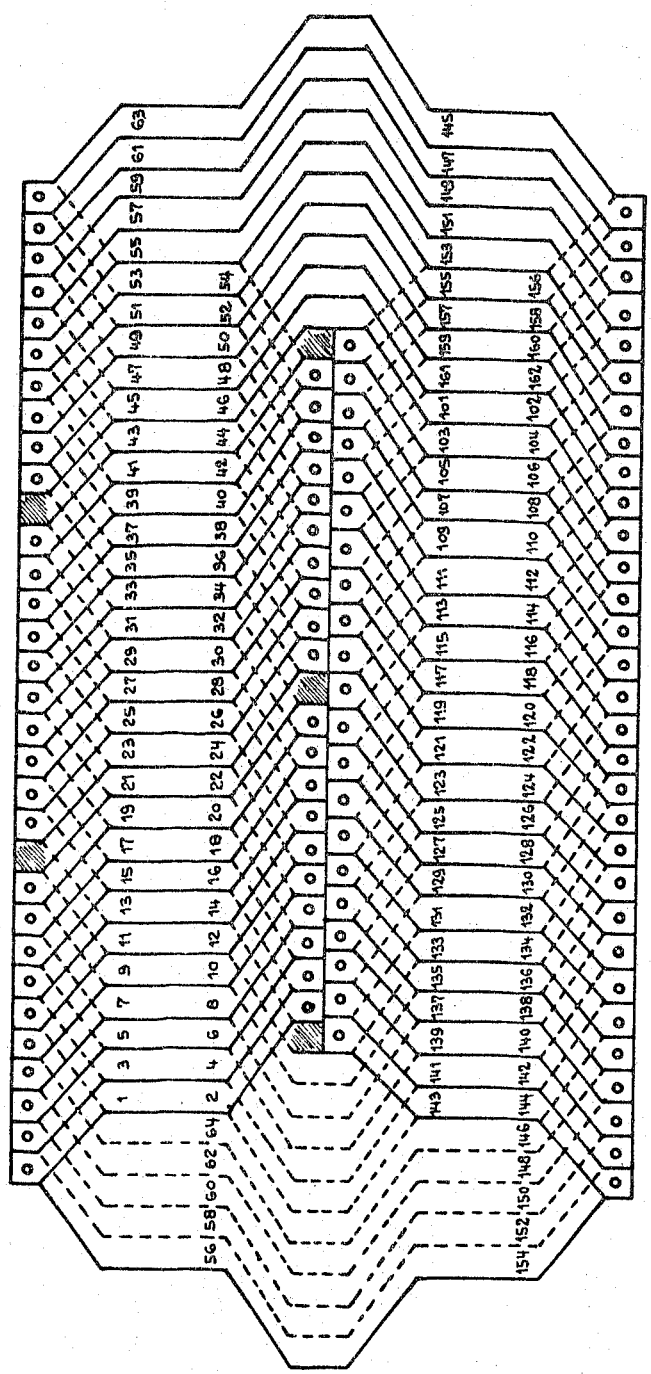
FIGS. 11 and 12 show winding members for six and eight poles respectively, derived from the preceding embodiments of the invention.

In the illustrative example of FIG. 11, the upper winding section has thirty-two half-turn conductors per face and the lower winding section has only thirty-one such half-turn conductors. With the numbering of conductors as shown in the drawing, the electrical circuit may be followed plainly as:

–56–1–14–23–36–45–101–112–121–132–141–152–58–3–
16–25–38–47–161–110–119–130–139–150–60–5–18–
27–40–49–159–108–117–128–137–148–62–7–20–29–
42–51–157–106–115–126–135–146–64–9–22–31–44–
53–155–104–113–124–133–144–2–11–24–33–46–55–
153–102–111–122–131–142–4–13–26–35–48–57–151–
162–109–120–129–140–6–15–28–37–50–59–149–160–
107–118–127–138–8–17–30–39–52–61–147–158–105–
116–125–136–10–19–32–41–54–63–145–156–103–
114–123–134–143–154–56.

There are four "dead" half-turn conductors in the upper series-wave section, namely 12–21–34 and 43. This may be avoided when desired, by modifying the pitch of the upper section winding according to FIG. 8 for instance.

Figure 12:
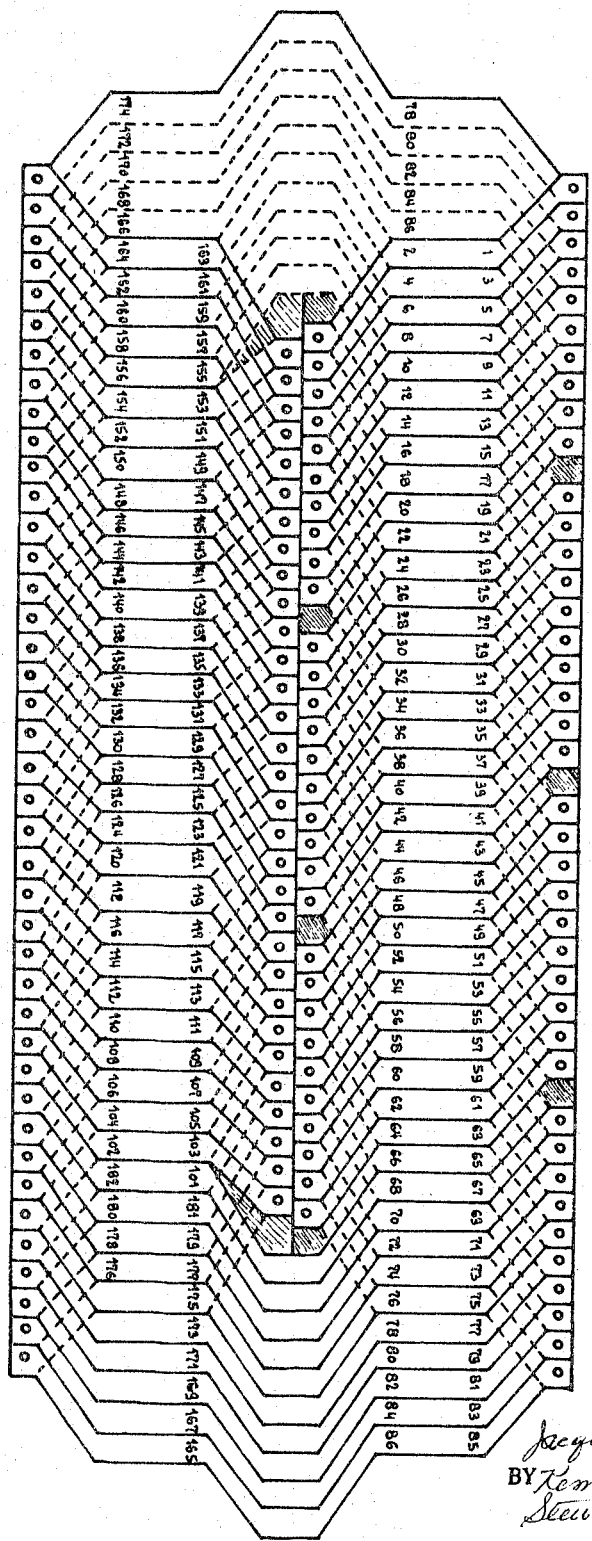

The electrical circuit of the eight pole winding member of FIG. 12 may be similarly followed. Such a circuit will leave six dead half-turn conductors, namely the same as above plus 56 and 65. Such dead conductors may also be avoided if desired.

The arrangement of FIG. 13 on the other hand relates to a two pole winding structure, five half-turn conductors per pole and face. In the illustrated example, there are ten conductors per face in the upper section and eleven conductors per face in the lower section. Conductor 1 is directly extended to conductor 101, conductor 3 to conductor 103, and so on, on the front face; on the rear face, conductors 2 and 102 are directly connected from the metallization of the carrier, so are conductors 4 and 104 and so on. The electrical circuit is closed finally through 119–122–121–112. Such a final connection may be replaced, when desired, by such an arrangement as shown in FIG. 10.

When the total height of the winding is desirable, it is possible, as shown in FIG. 14 derived from FIG. 8, to reduce the half-turn conductors of the lower section to mere slanted conductors joining the ends of the half-turn conductors and the terminals in said lower band section of the winding. It is still a series-wave winding of elementary form but, of course, uncapable to cooperate with a magnetic field structure. However, in such a case and when the winding member is used as an armature, the brushes may advantageously be applied to said lower band section, which consequently acts as a commutator in the machine, outside the airgap proper.

Generally speaking, each time a winding member according to the invention is used as an armature, it will be of advantage to place the cooperating brushes on a row of portions of conductors deprived of dead terminals.

Considering the case where the winding member, after being made, must be used as an armature in closed loop shape, for instance for a cylindrical airgap machine, it may advantageously comprise on each side of the longitudinal edge thereof, a metallized band such as shown at 400 in view (a) of FIG. 15, with uniformly spaced holes therein; in this view, the winding member is referred to as 401 for its part comprising the winding proper. The metallizations 400 are preferably thicker than the winding conductors. For making a rotor from such a flexible winding member, it suffices, as shown in view (b) of FIG. 15, to wrap it on two toothed disks such as 402 and 403 spaced apart along a shaft 405. The winding member is consequently both secured to the shaft mounting and stretched from the spacing of the disks. As shown in FIGS. 16 and 17, such a member may be wrapped so that it constitutes a single layer rotor, FIG. 16, or a multilayer rotor, FIG. 14, according to the number of poles in the machine with respect to the number of polar pitches said member spans over. As the electrical circuit is closed when the member is flat, there is no need for any further electrical connection to be made after it has so been wrapped on the supporting disks.

Such an arrangement of edge metallizations and holes therein with cooperating spaced disks carrying the teeth coming into said holes may be easily extended to machines the armature of which is looped and passes through at least one linear magnetic airgap, being supported by two pairs of rollers or wheels. In such a case, the lateral stretch is supplied by the spacing of the rollers or wheels in each pair and the longitudinal stretching is ensured by the spacing between such pairs.

Figure 18:
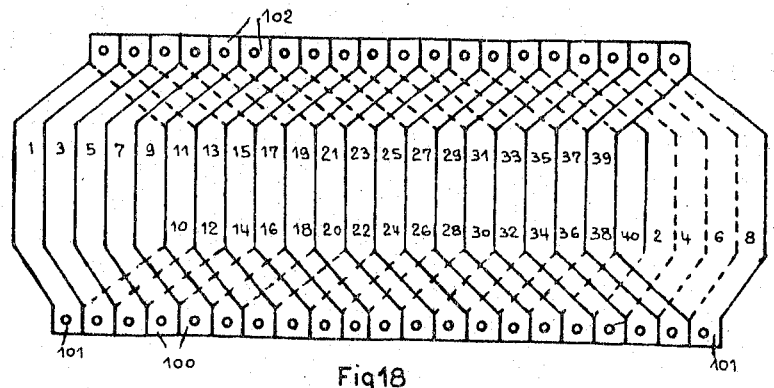

Considering now the case of a lap-wound kind of winding, it may first be stated, with reference to FIG. 18, that after printing a winding section of as many turns as required, for instance and as illustratively shown, a winding section of twenty half-turn conductors per face, for a four pole machine with five conductors per pole and face, it is sufficient, after warping the flat winding member into a closed loop, to make a through connection between the end terminals of the lower row 101, for closing the electrical circuit of the winding section, normal connections 100 and 102 being made.

Figure 19:
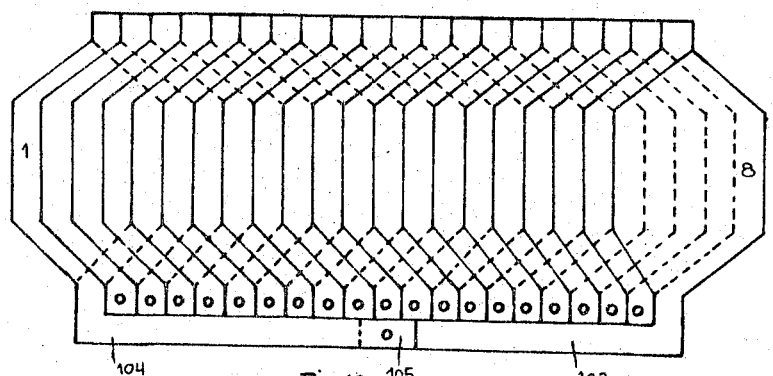

In order not to have any additional connection to make, and to have on the other hand a completely closed electrical circuit on the flat shaped winding member, FIG. 19, it is possible to extend conductor 1 on the front face and conductor 8 on the rear face by metallizations such as 104 and 103 extending longitudinally outside the winding band and on a little more than one-half of the carrier length. A through connection 105 ensures the closure of the electrical circuit. The twenty upper terminals and the twenty-one lower terminals of the half-turn conductors extend over identical lengths.

Figure 9:
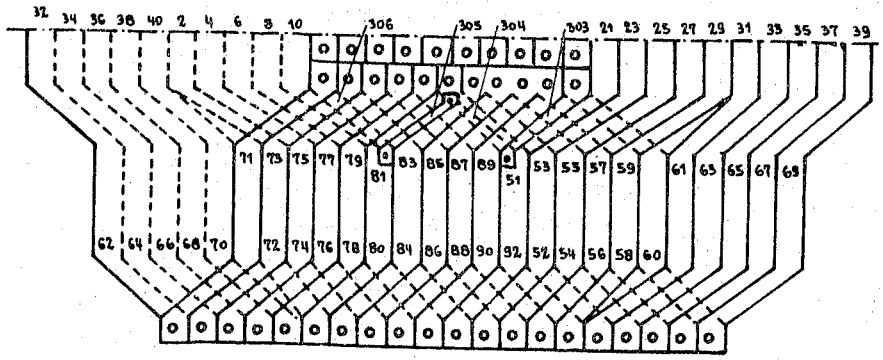
FIGS. 9 and 10 show two modifications of the lower winding band of the embodiment of FIG. 8.

Such an external connection may be integrated to the winding band in a similar fashion as described for the preceding FIGS. 8 to 10, for the series-wave winding members.

Figure 20:
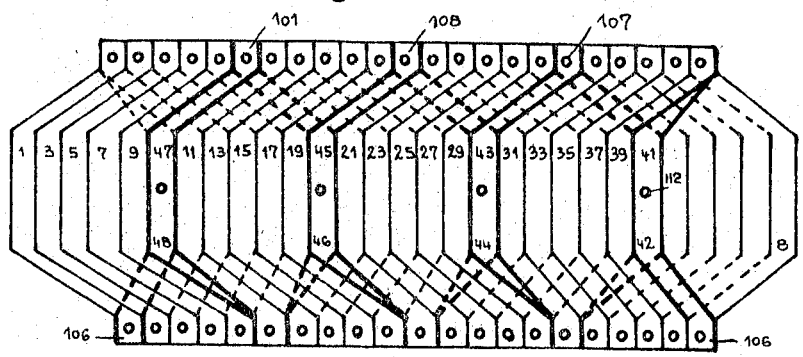

In the embodiment shown in FIG. 20, four additional half-turn conductors are provided on each face of the carrier and each pair, front and rear faces, of said additional conductors is inserted from five to five normal conductors, the FIG. 20 still considering a winding having twenty half-turn conductors per face and a four pole span of the member. For a same length of the member as before, the individual width of the conductors is only slightly reduced. The number of lower terminals is the same as in FIG. 19, but the upper row of terminals comprises three more units 107, 108 and 109. 106 denotes the two last end terminals in the lower row. On the front face the conductor 41 is inserted at the right of normal conductor 39, the conductor 43 between the conductors 29 and 31, the conductor 45 between the conductors 19 and 21, and the conductor 47 between the conductors 9 and 11. On the rear face, the conductor 42 is behind conductor 41, the conductor 44 behind the conductor 43, the conductor 46 behind the conductor 45 and the conductor 48 behind the conductor 47. The conductors of said additional group are interconnected by pairs by midposition plated holes such as 112 and each of them reaches a terminal on one of the terminal rows but at the other end thereof is not connected to any terminal, tapering in a surface terminating before the terminal row. It is useless to increase the number of dead terminals in the circuit and it is preferable to somewhat though slightly alter the regularity of the conductor pitches from the presence of such tapering conductor portions. The final closing connection for the electrical circuit of the winding is apparent—from terminal 106 of the rear normal conductor 8 through the additional conductors 41 and 42 to the additional terminal 107, through the additional conductors 43 and 44 to the additional terminal 108 through the additional conductors 45 and 46 to the additional terminal 109 and through the additional conductors 47 and 48 to the end terminal 106 connected to the front conductor 1.

Figure 21:
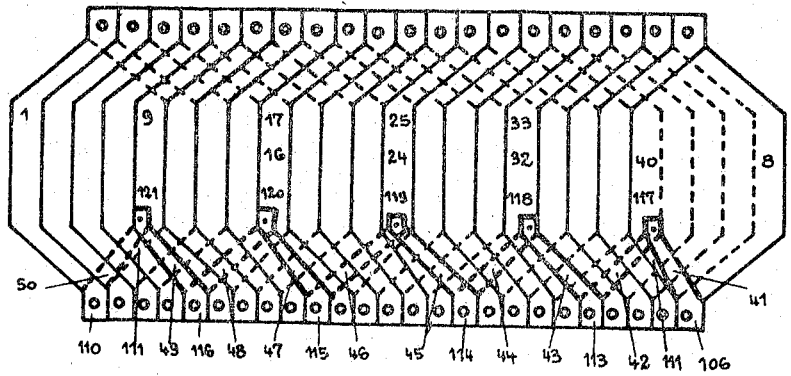

In the modification shown in FIG. 21, the additional conductors are restricted to the lower end portions of the normal half-turn conductors and terminals, that is to say within a narrow band of the winding band on the carrier. Four additional terminals, 113 to 116 are inserted in the lower row of terminals and five reduced size terminals are provided in lower ends of half-turn conductors, from 117 to 121. Additional conductors 41 to 50 connect these two rows of additional terminals, said conductors being obtained by subdividing certain ends of the normal conductors for the conductors 42 to 49, and by providing special additional metallizations on the insulating carrier for the conductors 41 and 50. The closure of the electrical circuit of the winding starts from terminal 106 ending the rear face conductor 8 to the front face conductor 41, passes to the additional terminal 107 and the rear face conductor 42 (divided from normal conductor 40) to the additional terminal 113 to the front face conductor 43 (divided from the normal conductor 33) to the additional terminal 118 to the rear face conductor 44 (divided from the normal conductor 32) to the terminal 114 to the front face conductor 45 (divided from the normal conductor 25) to the additional terminal 119 to the rear face conductor 46 (divided from the normal conductor 24), note that terminal 119 is provided at the middle place for rendering symmetrical the connection at this location in the winding; then the circuit passes to the additional terminal 115 to the front face conductor 47 (divided from the normal conductor 17) to the additional terminal 124 to the rear face conductor 48 (divided from the normal conductor 16) to the additional terminal 116 to the front face conductor 49 (divided from the normal conductor 9) to the additional terminal 121 to the additional rear face conductor 50 to the terminal 110 to conductor 1.

The advantage of the arrangement of FIG. 21 is that no superfluous conductors are inserted between normal conductors in the greater part of the winding band so that the polar areas are not disturbed from such absence of additional inserted conductors.

Figure 22:
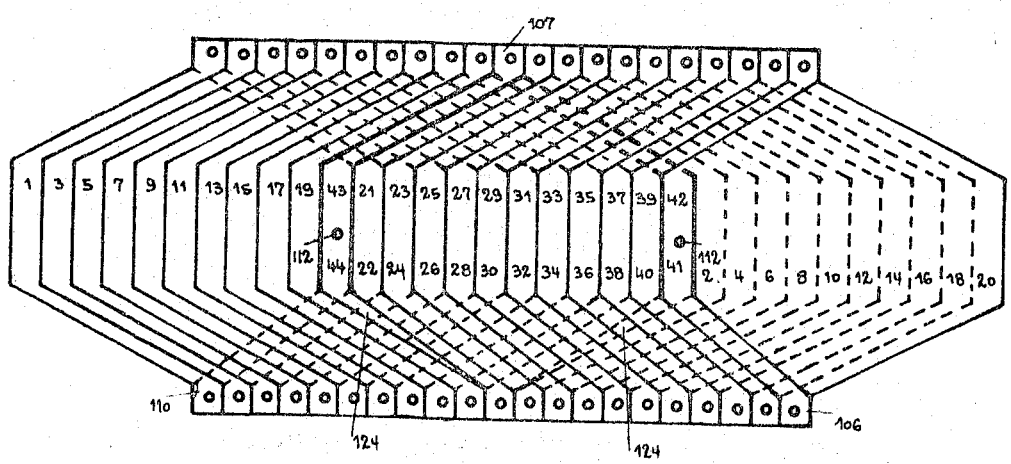

FIG. 22 shows a transposition of the winding of FIG. 20 to a two-pole winding with the same number of normal half-turn conductors, i.e. twenty. There only remains two pairs of additional conductors 41–42 and 43–44 and one additional terminal 107 in the upper row. The pitch of the lower portions of the conductors is only disturbed by a single extension such as 124 on each face of the insulating carrier, for conductor 42 on the rear face, for conductor 43 on the front face. With the numbering of the half-turn conductors as shown, conductor 43 is inserted between the normal conductors 19 and 21 and conductor 41 at the right of the normal conductor 39. On the rear face, conductor 44 is at the left of the normal conductor 22 and conductor 41 is inserted between the normal conductors 40 and 2. The electrical circuit closes finally from 20, 106, 41, 42, 107, 43, 44, 110 and 1.

Figure 23:
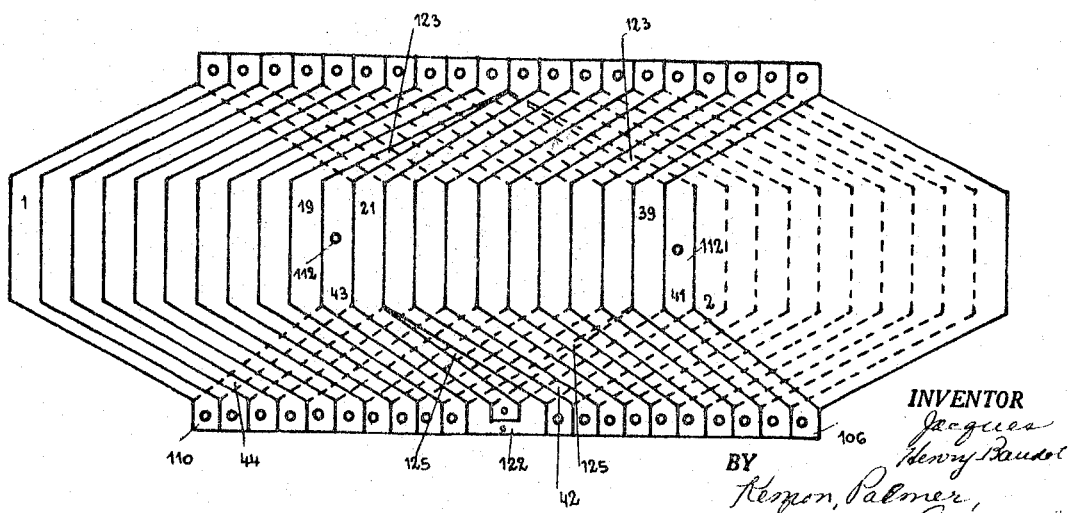

FIG. 23 is a modification of FIG. 22 wherein the additional terminal is placed in the lower row of terminals, at 122, encompassing the normal winding terminal which is pushed upside at this place. There remain two tapered conductor portions 123, inactive in the upper portion of the winding and two tapered portions 125, inactive in the lower portion of the winding.

Figure 24:
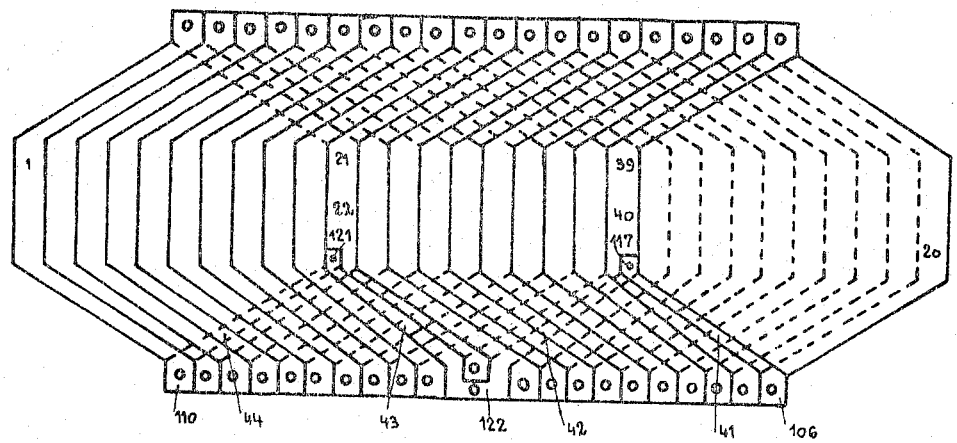

FIG. 24 is a plain transposition for a two pole winding member of the arrangement of FIG. 21 but for the connection between the additional conductors 42 and 43 which is shown as made as the connection 122 in FIG. 23.

Figure 25:
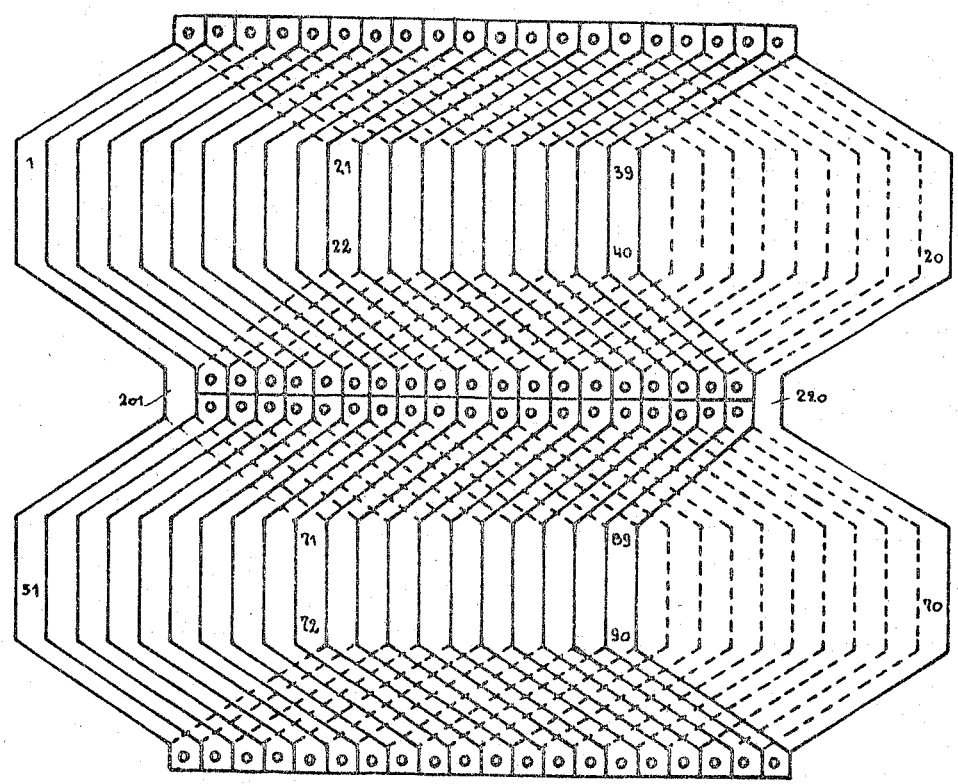

FIG. 25 shows an example of a double lap-wound winding member, the winding sections progressing in opposite directions from the upper winding band to the lower one. The end conductors 20 and 70 of the winding sections are directly connected by a metallization 220 of the carrier and the conductors 1 and 51 are similarly connected by a metallization 201.

Instead of being rectilinear, the carrier may, when required be arcuate as well.

What is claimed is:

1. A winding member for an electric rotary machine comprising a flat elongated insulating carrier of finite length, at least one winding band on said carrier extending over the length thereof, a winding section within said winding band comprising first and second sets of half-turn conductors on opposite faces of said carrier, each set leaving at relatively opposite ends of the winding band from one set to the other one a bare insulating surface extending substantially over the span of one polar pitch of said winding section, each half-turn conductor extending substantially transversely to the winding band with ends laterally shifted at the span of substantially one-half of said polar pitch, said shift being relatively reversed from one set to the opposite one, face-to-face connections between the registering half-conductor ends complete in one row of such ends and partial between the registering conductor ends in the other row of such ends, and additional conductor means on said carrier for closing the electrical circuit of said winding section by connecting by pairs between opposite ends of said winding band those ends of half-turn conductors not included in said face-to-face connections in said other row.

2. A winding member according to claim 1, wherein the insulating carrier is flexible and the edges thereof are metallized by thickened metallizations provided with regularly spaced perforations therein for cooperation with teeth of sprocket wheels in machines embodying it.

3. A winding member according to claim 1, wherein the said additional conductors are, at least partly, integrated in the winding band of the carrier.

4. A winding member according to claim 3, wherein parts at least of said additional conductors are interposed between normal half-turn conductors of the winding section.

5. A winding member according to claim 3, wherein part at least of said additional conductors are made from subdivisions of part of the half-turn conductors of the winding section in restricted width and height areas of said half-turn conductors.

6. A winding member according to claim 3, wherein the winding section is of the lap-wound pattern kind and the additional conductors delineate a series-wave pattern within said lap-wound one between the end conductors thereof.

7. A winding member according to claim 1, wherein said additional conductor means are placed on a band of the carrier parallel to and distinct from the winding band.

8. A winding member according to claim 7, wherein the winding section is of the lap-wound kind and the said second band comprises direct extensions of the end conductors of the section with a middle through connection between said extensions on opposite faces of the carrier.

9. A winding member according to claim 7, wherein said additional conductors are, for part at least of them, direct extensions of half-turn conductors in the said winding section developed on the first winding band in each one of said first and second sets and face-to-face connections are made between the additional conductors on opposite faces of the carrier for completing the said electrical circuit within said second band of the carrier.

10. A winding member according to claim 9, wherein said additional conductors constitute in said second band at least another section of a winding.

11. A winding member according to claim 9, wherein said additional conductors present, on one face at least of the insulating carrier, major parts extending parallelly to the longitudinal edges of said carrier.

12. A winding member according to claim 11, wherein said insulating carrier is flexible and said additional conductors are distributed in a second winding band of substantially the same height as the first one in two groups, each near an edge of said second band and each of a reduced height with respect to the height of said bands.

13. A winding member according to claim 10, wherein both windings sections are of the lap-wound kind and the first and second winding sections are images of one another with respect to a mid-height line longitudinal to the carrier, end conductors in said sections being mutual extensions from one section to the other one.

14. A winding member according to claim 10, wherein said additional conductors are shaped and distributed for defining a minimum pole area of the turns in the minimum height of said second band.

15. A winding member according to claim 10, wherein the first winding section is of the series-wave kind and the second winding band includes half-turns of the lap-wound kind, the connections between end conductors of the first section winding following in said second winding section turns serially connected of said lap-wound type.

16. A winding member according to claim 15, wherein the connections between the conductor ends from the first to the second winding section comprise through connections of the insulating carrier for extensions of the conductors of the first section on one face of the carrier to the conductors of the second section on the opposite face of the carrier.

17. A winding member according to claim 10, wherein said additional conductors in said second winding section are shaped and distributed for defining polar areas substantially equal to those defined in the first winding section in the member.

18. A winding member according to claim 17, wherein both said first winding section and said second winding section are of the series-wave kind, additional conductors extending from ends of normal conductors at both ends of the winding bands over a span of twice the polar pitch of said winding sections.

19. A winding member according to claim 18, wherein in said second winding section, the connection between the end conductors follows a circuit including half-turn conductors normally integrated in said winding section.

20. A winding member according to claim 18, wherein in said second winding section, the connection between the end conductors thereof follows a circuit which, for part at least, is restricted to a reduced height of the said second section winding band, resulting from subdivision of parts of the half-turn conductors in said second section at such restricted height and face-to-face connections between such subdivided parts of the conductors.

21. A winding member according to claim 18, wherein each of said winding bands comprises winding sections which are serially interconnected by end overlapping half-turn conductors thereof and wherein each pair of winding sections in the upper and lower band are otherwise interconnected by direct extensions of their half-turns, but for the said overlapping end ones, over the said twice polar pitch end spans.

22. A winding member according to claim 18, wherein the first winding section is made of progressive winding pitch and the second winding section is made of recessive winding pitch.

23. A winding member according to claim 18, wherein the extension of the first section conductors to the additional conductors is made from plain metallization between the ends of said conductors provided on the same face of the insulating carrier.

24. A winding member according to claim 18, wherein the extension of the first section conductors to the said additional conductors is made by means of through connections between adjacent ends of said conductors, respectively applied on opposite faces of the carrier.

25. A winding member according to claim 18, wherein said additional conductors are made of slanted metallizations of opposite orientations from one face to the other ones.

26. A winding member according to claim 18, wherein the connection between the end conductors in said second winding section is made externally to said second winding head, from extensions of said end conductors parallelly to the length of the carrier with a through connection therebetween.

27. A winding member according to claim 18, wherein the insulating carrier is flexible and the end conductors of the second winding section are open-ended and spaced apart for overlapping when the member is made into a closed loop.

References Cited
UNITED STATES PATENTS

| | | | |
|---|---|---|---|
| 1,813,394 | 7/1931 | Fraser | 310—266 |
| 3,209,187 | 9/1965 | Angele | 310—266 |
| 3,259,768 | 7/1966 | Burr | 310—266 |

MILTON O. HIRSHFIELD, *Primary Examiner.*

L. L. SMITH, *Assistant Examiner.*